United States Patent
Zakowski

(10) Patent No.: US 12,262,850 B2
(45) Date of Patent: *Apr. 1, 2025

(54) FOOD PROCESSOR HAVING DETACHABLE SPRING-LOADED LID

(71) Applicant: Conair LLC, Stamford, CT (US)

(72) Inventor: Joseph W. Zakowski, New Canaan, CT (US)

(73) Assignee: Conair LLC, Stamford, CT (US)

( * ) Notice: Subject to any disclaimer, the term of this patent is extended or adjusted under 35 U.S.C. 154(b) by 572 days.

This patent is subject to a terminal disclaimer.

(21) Appl. No.: 16/387,824

(22) Filed: Apr. 18, 2019

(65) Prior Publication Data

US 2019/0239694 A1 Aug. 8, 2019

Related U.S. Application Data

(63) Continuation of application No. 14/244,970, filed on Apr. 4, 2014, now Pat. No. 10,448,787.

(60) Provisional application No. 61/809,480, filed on Apr. 8, 2013.

(51) Int. Cl.
*A47J 43/07* (2006.01)

(52) U.S. Cl.
CPC ........ *A47J 43/0716* (2013.01); *A47J 43/0722* (2013.01); *A47J 43/0727* (2013.01)

(58) Field of Classification Search
CPC .. B65D 43/02; B65D 43/0214; A47J 27/2117; A47J 31/4407; A47J 36/06; A47J 36/00; A47J 36/12; A47J 37/101; A47J 37/128; A47J 43/0716; A47J 43/0727; A47J 27/21175; A47J 36/10; A47J 43/0772; A47J 43/0777

See application file for complete search history.

(56) References Cited

U.S. PATENT DOCUMENTS

| | | | | |
|---|---|---|---|---|
| 1,703,185 | A * | 2/1929 | White | B65D 45/18 |
| | | | | 215/227 |
| 6,105,809 | A * | 8/2000 | Yamanaka | A47J 36/06 |
| | | | | 16/257 |
| 6,851,351 | B2 * | 2/2005 | Payen | A47J 36/38 |
| | | | | 55/DIG. 36 |

(Continued)

FOREIGN PATENT DOCUMENTS

| CA | 2714947 A1 * | 3/2011 |
|---|---|---|
| EP | 2298144 A1 * | 3/2011 |

(Continued)

*Primary Examiner* — Jared O Brown
(74) *Attorney, Agent, or Firm* — Grogan, Tuccillo & Vanderleeden LLP

(57) ABSTRACT

A food processor includes a base, a motor disposed within the base, an output shaft operatively connected to the motor and extending outwardly from the base, the output shaft being rotatable about a shaft axis upon actuation of the motor, a work bowl received on the base, the work bowl having a receiving channel on an upper portion thereof, and lid removably connected to the work bowl and having a coupling member received in the receiving channel. The lid is pivotable between a first position, in which the lid rests atop the work bowl and substantially encloses an interior of the work bowl, and a second position, in which the lid is pivoted out of alignment with the work bowl to provide access to the interior of the work bowl.

12 Claims, 5 Drawing Sheets

(56) References Cited

U.S. PATENT DOCUMENTS

| | | | |
|---|---|---|---|
| 9,211,040 B2* | 12/2015 | Lane | A45F 3/16 |
| 10,448,787 B2* | 10/2019 | Zakowski | A47J 43/0716 |
| 2002/0038804 A1* | 4/2002 | Gourand | A47J 27/21175 |
| | | | 220/835 |
| 2004/0007136 A1* | 1/2004 | Payen | A47J 37/1271 |
| | | | 99/330 |
| 2005/0229788 A1* | 10/2005 | White | A47J 36/10 |
| | | | 99/323 |
| 2006/0261066 A1* | 11/2006 | Boozer | A47J 43/0727 |
| | | | 220/784 |
| 2007/0125803 A1* | 6/2007 | Kodden | A47J 31/0678 |
| | | | 222/222 |
| 2013/0334352 A1* | 12/2013 | Beber | A47J 43/0716 |
| | | | 241/100 |
| 2014/0021278 A1* | 1/2014 | Armstrong | A47J 43/0788 |
| | | | 241/37.5 |

FOREIGN PATENT DOCUMENTS

| | | | | |
|---|---|---|---|---|
| JP | H0610916 Y2 * | 3/1994 | | |
| KR | 200436671 Y1 * | 9/2007 | | |
| WO | WO-0191618 A2 * | 12/2001 | | A47J 36/12 |

* cited by examiner

FOOD PROCESSOR HAVING DETACHABLE SPRING-LOADED LID

CROSS-REFERENCE TO RELATED APPLICATIONS

This application is a continuation of U.S. patent application Ser. No. 14/244,970, filed on Apr. 4, 2014, which claims the benefit of U.S. Provisional Application Ser. No. 61/809,480, filed on Apr. 8, 2013, both of which are hereby incorporated by reference herein in their entireties.

FIELD OF THE INVENTION

The present invention relates to food processors and, more particularly, to a food processor having a detachable, spring-loaded lid.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use, functionality and ergonomics.

SUMMARY OF THE INVENTION

It is an object of the present invention to provide a food processor having a detachable lid.

It is another object of the present invention to provide a food processor having a detachable, spring-loaded lid.

It is another object of the present invention to provide a food processor having a lid that substantially eliminates drippings from the lid.

It is another object of the present invention to provide a food processor having a lid that includes a latch for securing the lid.

These and other objects are achieved by the present invention.

According to an embodiment of the present invention, a food processor having a detachable, spring-loaded lid is provided. The lid is pivotally connected to a work bowl via a spring-loaded hinge that biases the lid to an open position. A manually operable latch on the lid opposite the hinge allows a user to close the lid and lock the lid to the work bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
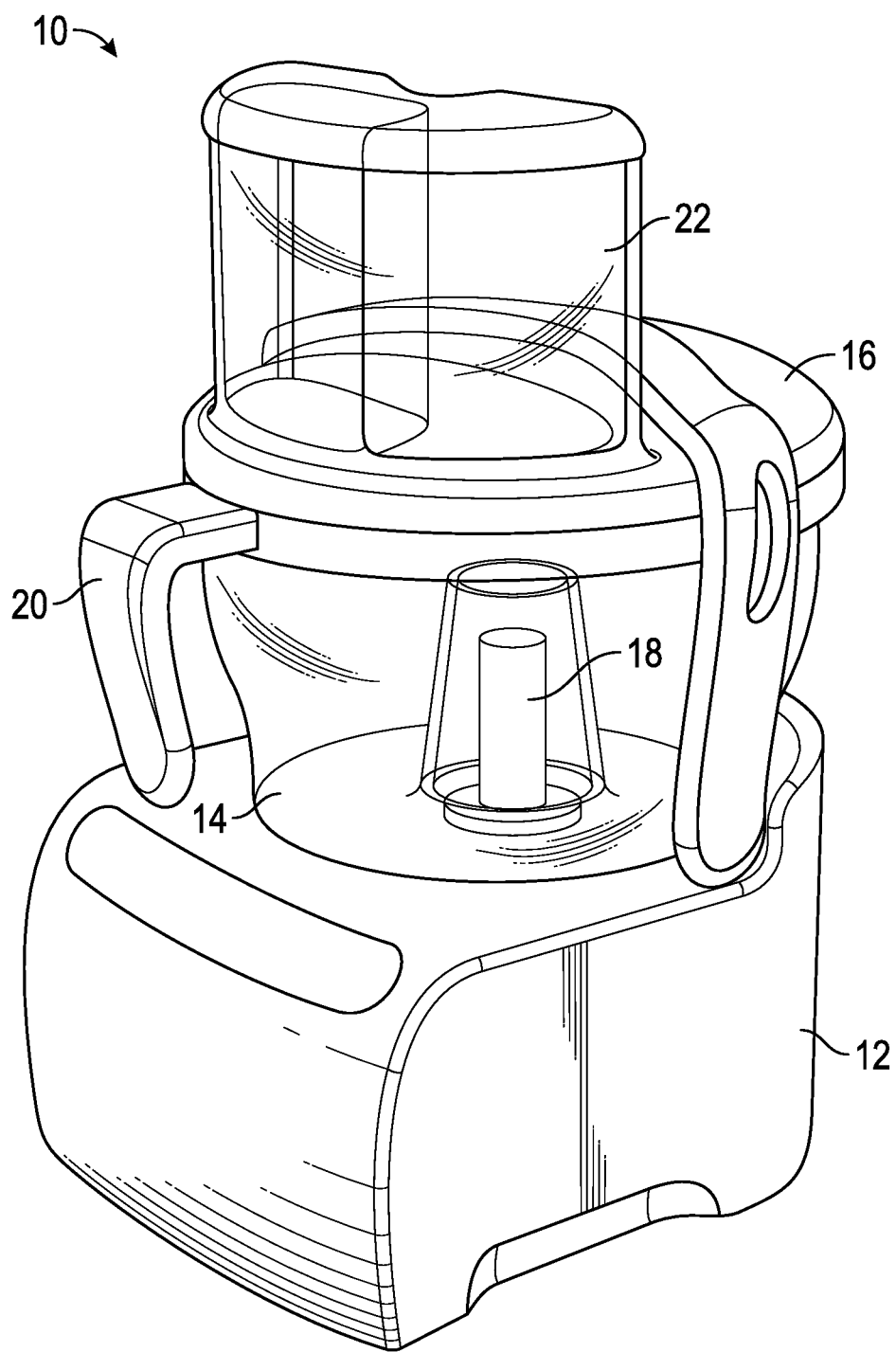
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
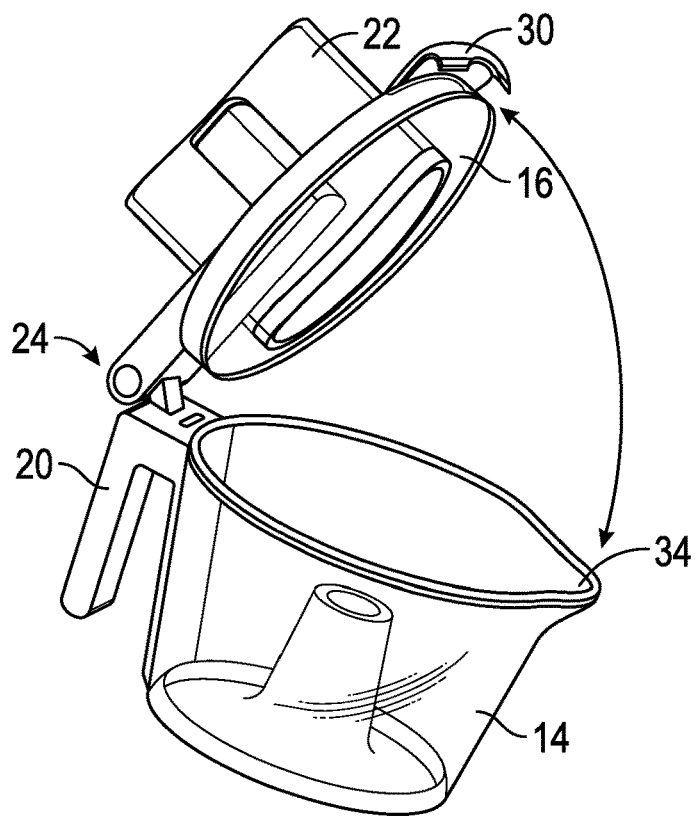
FIG. 2 is a perspective view of a detachable, spring-loaded lid of the food processor of FIG. 1, according to an embodiment of the present invention.
Figure 3:
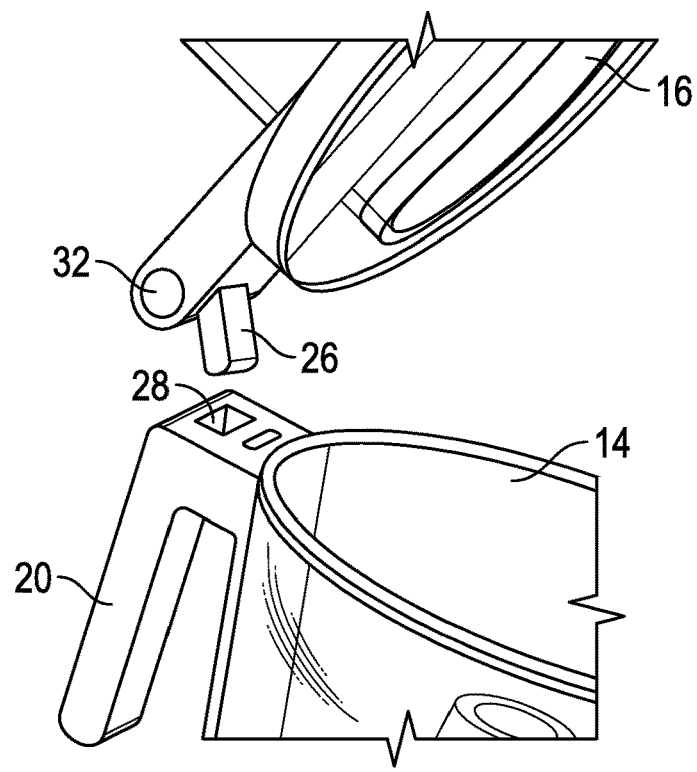
FIG. 3 is an enlarged, detail view of a hinge mechanism of the detachable, spring-loaded lid of FIG. 2.

Referring now to FIGS. 2 and 3, the lid 16 is pivotally connected to the work bowl 14 via a spring-loaded hinge 24 that is configured to bias the lid 16 to an open position, as shown in FIG. 2. As best shown in FIG. 3, the spring-loaded hinge 24 includes a spring-biased leg 26 operatively connected to the lid 16 that is received in a corresponding slot 28 in an upper portion of the handle 20 on the work bowl 12. A pushbutton 32 on the hinge 24 allows a user to quickly and easily decouple the lid 16 from the bowl 12 by depressing the button 32 for cleaning and the like.

As also shown in FIG. 2, the lid also 16 includes a latch 30 on the front thereof, opposite the hinge 24. The latch 30 is configured to engage an upper portion of the bowl 14 adjacent to a pour spout 34, which allows a user to lock the lid 16 in a closed position. In operation, the spring-loaded hinge 24 allows the lid to gently spring open, to the position shown in FIG. 2, when the latch 30 is manually released by a user. To close the lid 16, a user simply exerts downward pressure on the 16 to bring it into engagement with an upper lip of the bowl, and then secures the lid to the bowl via the latch 30.

Figure 4:
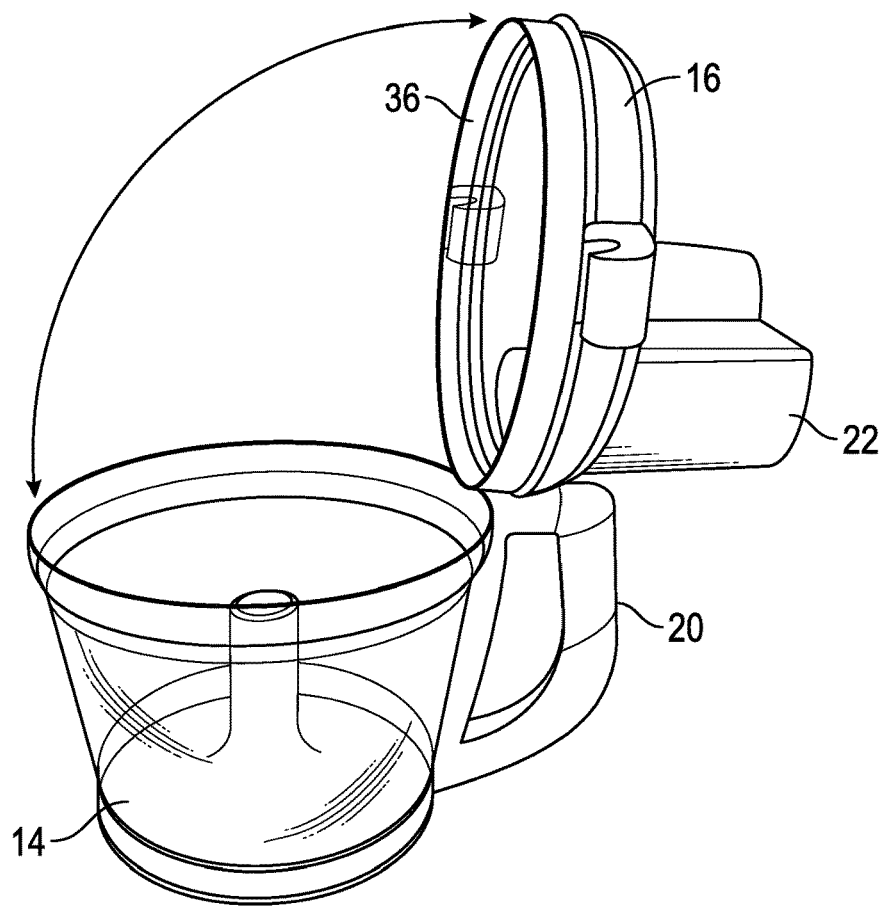
FIG. 4 is another perspective view of the detachable, spring-loaded lid of FIG. 2.
Figure 5:
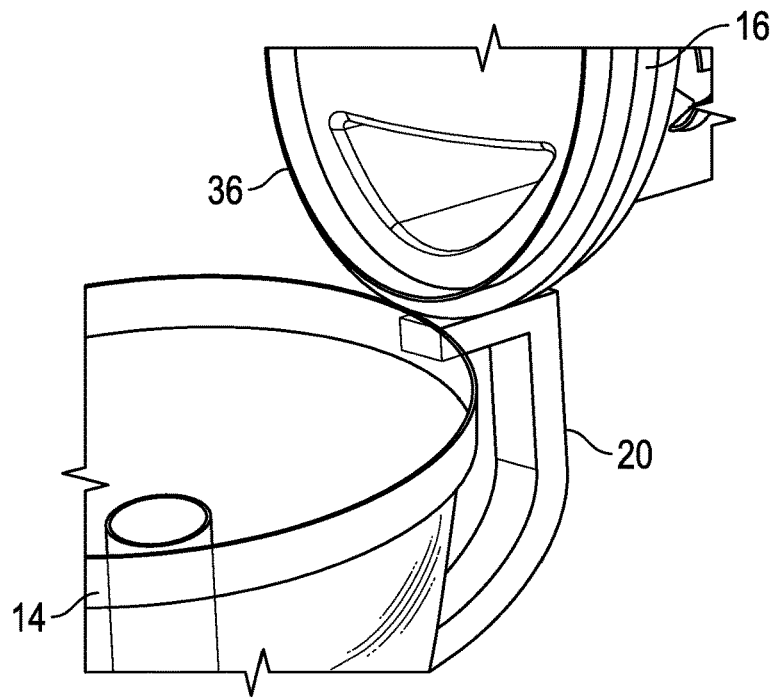
FIG. 5 is an enlarged, detail view of the detachable, spring-loaded lid of FIG. 4, illustrating the containment of lid drippings.

Turning now to FIGS. 4 and 5, the lid 16 further includes a circumferential lip 36 protruding from a bottom of the lid. As shown, therein, this lip 36 ensures that any drippings of processed food items from the lid 16 go back into the bowl 14, rather than spill outside the bowl 14. In particular, the circumferential lip 36 is dimensioned (and protrudes from the underside of the lid to such an extent) such that the lip 36 extends to a radial location inward from an outer peripheral lip of the work bowl 14 when the lid 16 is in its fully open position.

Figure 6:
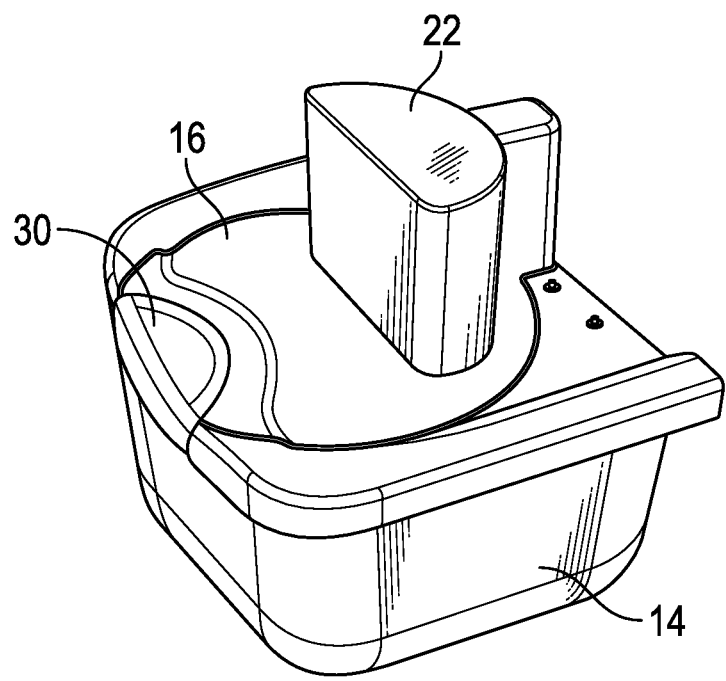
FIG. 6 is a perspective view of a detachable, spring-loaded lid having a latch according to an embodiment of the present invention, illustrating a locked position thereof.
Figure 7:
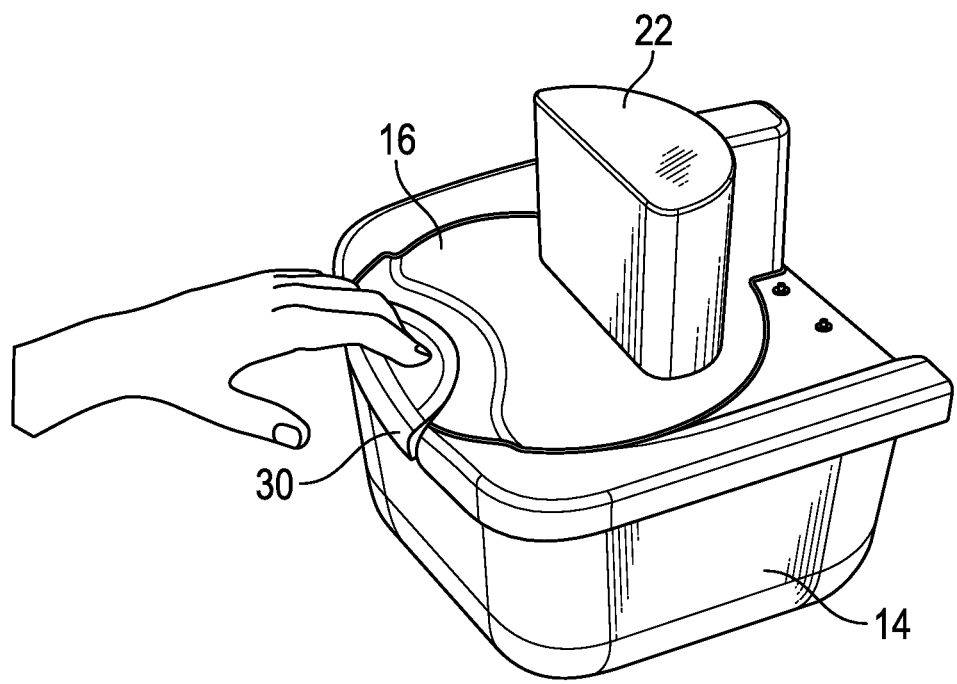
FIG. 7 is a perspective view of the detachable, spring-loaded lid having a latch of FIG. 6, illustrating an unlocked position.
Figure 8:
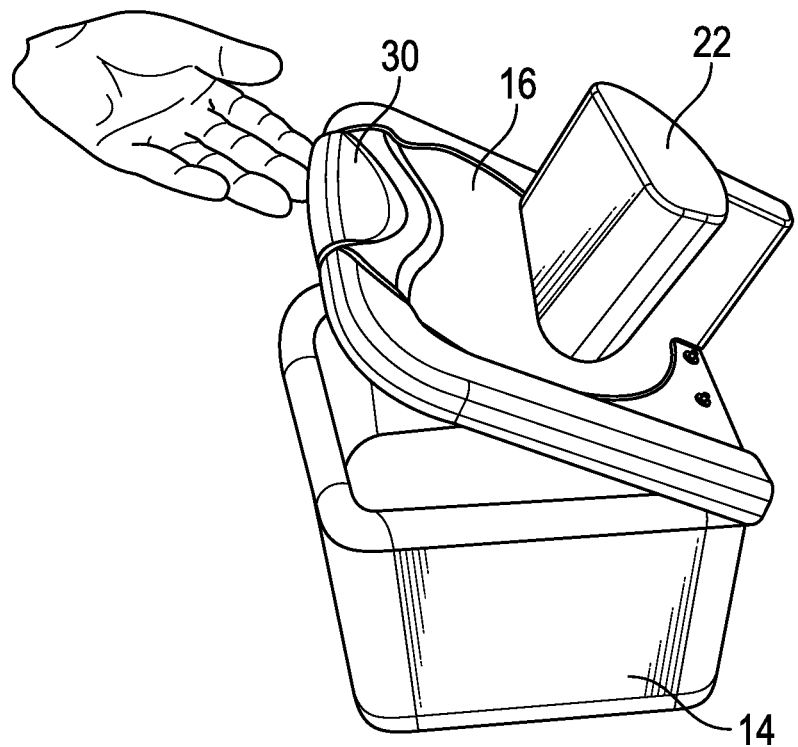
FIG. 8 is a perspective view of the detachable, spring-loaded lid having a latch of FIG. 6, illustrating an unlocked and raised position.
Figure 9:
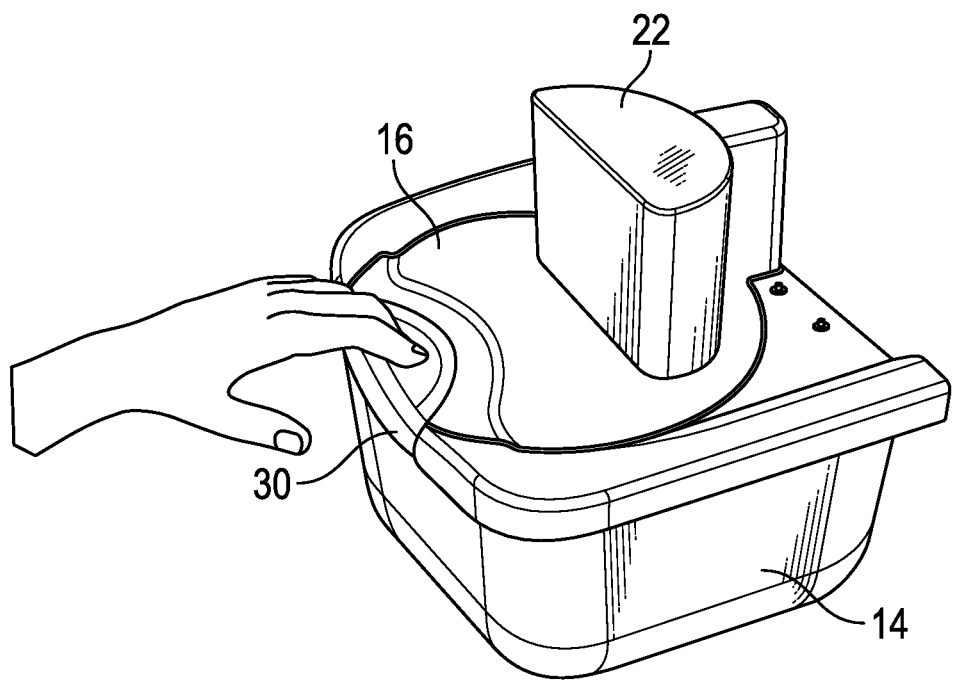
FIG. 9 is a perspective view of the detachable, spring-loaded lid having a latch of FIG. 6, illustrating a closed position.

FIGS. 6-9 illustrate manual operation of the latch 30. In particular, FIGS. 6 and 7 illustrate the opening of the lid 16 via the latch 30. Conversely, FIGS. 8 and 9 illustrate the closure and locking of the lid to a work bowl 14.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor, comprising:
   a base;
   a motor disposed within said base;
   an output shaft operatively connected to said motor and extending outwardly from said base, said output shaft being rotatable about a shaft axis upon actuation of said motor;
   a work bowl removably received on said base, said work bowl having a receiving channel on an upper portion thereof; and
   a lid removably connected to said work bowl and having a coupling member received in said receiving channel, said coupling member configured to provide a pivoting connection between said lid and said bowl;
   wherein said lid is pivotable about said coupling member between a first position, in which said lid rests atop said work bowl and substantially encloses an interior of said work bowl, and a second position, in which said lid is pivoted out of alignment with said work bowl to provide access to said interior of said work bowl;
   wherein said coupling member is spring-biased;
   wherein said work bowl and said lid are removable from said base without removing said coupling member from said receiving channel;
   wherein removing said coupling member from said receiving channel removes said lid from said work bowl;
   wherein said food processor further includes a single pushbutton associated with said lid and said coupling member;
   wherein said work bowl includes a pour spout at an upper portion of said work bowl, and said lid includes a latch configured to engage an upper lip of said work bowl adjacent to said pour spout;
   wherein said lid includes a circumferential lip that protrudes from an underside of said lid; and
   wherein said circumferential lip extends into said work bowl when said lid is in said first position, and such that a distal edge of said circumferential lip extends over an interior of said work bowl when said lid is in a fully open position so that drippings of processed food items remaining on said lid drip back into said work bowl.

2. The food processor of claim 1, wherein:
   said pushbutton is configured to decouple said lid from said work bowl.

3. The food processor of claim 1, wherein said latch is opposite a handle of said work bowl, and said latch is configured to selectively engage said upper lip of said work bowl to retain said lid in said first position.

4. The food processor of claim 3, wherein:
   engagement of said coupling member with said receiving channel, and said latch, provide for attachment of said lid to said work bowl without rotation of said lid about a central axis extending through said work bowl.

5. The food processor of claim 1, wherein:
   in said second position, said lid remains attached to said work bowl.

6. The food processor of claim 1, wherein:
   said work bowl includes a handle; and
   wherein said receiving channel for said coupling member is formed in an upper portion of said handle.

7. The food processor of claim 1, wherein said latch is opposite a handle of said work bowl, and said latch is configured to selectively engage said upper lip of said work bowl to retain said lid in said first position;
   wherein a front of said lid is depressible by a hand of a user to release said latch from said work bowl.

8. A food processor, comprising:
   a base;
   a motor disposed within said base;
   an output shaft operatively connected to said motor and extending outwardly from said base, said output shaft being rotatable about a shaft axis upon actuation of said motor;
   a work bowl removably received on said base and having a handle; and
   a lid removably connected to said work bowl;
   wherein said lid and said work bowl are configured to provide for attachment of said lid to said work bowl without rotation of said lid about said shaft axis;
   wherein said work bowl includes a receiving channel;
   wherein said lid includes a spring-biased coupling member, said coupling member of said lid being received in said receiving channel of said work bowl and configured to provide a hinged connection between said lid and said work bowl;
   wherein said work bowl and said lid are removable from said base without removing said coupling member from said receiving channel; and
   wherein removing said coupling member from said receiving channel removes said lid from said work bowl; and
   wherein said food processor further includes a pushbutton associated with said lid and said coupling member;
   wherein said work bowl includes a pour spout at an upper portion of said work bowl, and said lid includes a latch configured to engage an upper lip of said work bowl adjacent to said pour spout;
   wherein said lid includes a circumferential lip that protrudes from an underside of said lid; and
   wherein said circumferential lip extends into said the work bowl when said lid is in said first position, and such that a distal edge of said circumferential lip extends over an interior of said work bowl when said lid is in a fully open position so that drippings of processed food items remaining on said lid drip back into said work bowl.

9. The food processor of claim 8, wherein:
said pushbutton is configured to decouple said lid from said work bowl.

10. The food processor of claim 8, wherein:
said lid is hingedly connected to said work bowl and pivotable between a first position, in which said lid rests atop said work bowl and substantially encloses an interior of said work bowl, and a second position, in which said lid is pivoted out of alignment with said work bowl to provide access to said interior of said work bowl.

11. The food processor of claim 10, wherein said latch is opposite a handle of said work bowl, and said latch is configured to selectively engage said upper lip of said work bowl to retain said lid in said first position.

12. A work bowl for a food processor, comprising:
said work bowl being configured for releasably mating attachment to a base of a food processor, said work bowl having a handle;
a lid having a depending leg received in a slot in an upper surface of said-the work bowl and configured to provide a hinged connection of said lid to said work bowl and pivotable between a first position, in which said lid rests atop said work bowl and substantiallyencloses an interior of said work bowl, and a second position, in which said lid is pivoted out of alignment with said work bowl to provide access to said interior of said work bowl;
wherein said lid and said work bowl are configured to provide for attachment of said lid to said work bowl without rotation of said lid about a central axis extending vertically through said work bowl;
wherein said work bowl and said lid are removable from said base without removing said depending leg from said slot;
wherein removing said depending leg from said slot removes said lid from said work bowl; and
wherein said work bowl further includes a pushbutton associated with said lid and said hinged connection;
wherein said work bowl includes a pour spout at an upper portion of said work bowl, and said lid includes a latch configured to engage an upper lip of said work bowl adjacent to said pour spout;
wherein said lid includes a circumferential lip that protrudes from an underside of said lid; and
wherein said circumferential lip extends into said work bowl when said lid is in said first position, and such that a distal edge of said circumferential lip extends over an interior of said work bowl when said lid is in a fully open position so that drippings of processed food items remaining on said lid drip back into said work bowl.

\* \* \* \* \*